United States Patent
Hosabettu et al.

(10) Patent No.: US 10,248,857 B2
(45) Date of Patent: Apr. 2, 2019

(54) SYSTEM AND METHOD FOR DETECTING AND ANNOTATING BOLD TEXT IN AN IMAGE DOCUMENT

(71) Applicant: Wipro Limited, Bangalore (IN)

(72) Inventors: Raghavendra Hosabettu, Bangalore (IN); Raghav Nagpal, Bangalore (IN); Adithya, Bangalore (IN)

(73) Assignee: Wipro Limited, Bangalore (IN)

( * ) Notice: Subject to any disclaimer, the term of this patent is extended or adjusted under 35 U.S.C. 154(b) by 13 days.

(21) Appl. No.: 15/474,183

(22) Filed: Mar. 30, 2017

(65) Prior Publication Data

US 2018/0285334 A1 Oct. 4, 2018

(51) Int. Cl.
*G06F 17/00* (2019.01)
*G06K 9/00* (2006.01)
*G06K 9/46* (2006.01)
*G06K 9/62* (2006.01)

(52) U.S. Cl.
CPC ....... *G06K 9/00442* (2013.01); *G06K 9/4604* (2013.01); *G06K 9/4638* (2013.01); *G06K 9/6276* (2013.01); *G06K 2209/01* (2013.01)

(58) Field of Classification Search
CPC .............................. G06F 17/241; G06F 17/212
USPC ................. 715/230, 200, 233, 231
See application file for complete search history.

(56) References Cited

U.S. PATENT DOCUMENTS

| | | | |
|---|---|---|---|
| 5,668,891 A * | 9/1997 | Fan | G06K 9/6807 |
| | | | 382/168 |
| 5,953,453 A | 9/1999 | Fan et al. | |
| 6,088,478 A * | 7/2000 | Davies | G06T 9/005 |
| | | | 382/168 |
| 6,115,498 A | 9/2000 | Ro et al. | |
| 6,741,745 B2 | 5/2004 | Dance et al. | |
| 8,164,762 B2 | 4/2012 | Rizzo | |
| 8,356,045 B2 | 1/2013 | Chang et al. | |
| 8,787,660 B1 * | 7/2014 | Simon | G06K 9/6828 |
| | | | 345/468 |
| 9,298,675 B2 | 3/2016 | Wineman et al. | |
| 9,305,250 B2 | 4/2016 | Nakai | |
| 9,508,043 B1 | 11/2016 | Schlachter et al. | |
| 9,785,850 B2 * | 10/2017 | Barton | G06K 9/18 |
| 9,875,429 B2 * | 1/2018 | Wang | G06K 9/6257 |

(Continued)

OTHER PUBLICATIONS

Baoli et al., "An Improved K-Nearest Neighbor Algorithm for Text Categorization", published 2012 by SemanticScholar at https://www.semanticscholar.org/paper/An-Improved-k-Nearest-Neighbor-Algorithm-for-Text-Li-Yu/490ab325ba480f6fb71cdbb5f87ff4cb70918686, pp. 1-7.*

(Continued)

*Primary Examiner* — Manglesh M Patel
(74) *Attorney, Agent, or Firm* — LeClairRyan PLLC (57) ABSTRACT

This disclosure relates generally to image processing, and more particularly to system and method for detecting and annotating bold text in an image document. In one embodiment, a method is provided for annotating bold text in an image document. The method comprises receiving the image document, processing the image document to derive a digitized textual image, detecting one or more regions of bold text within the digitized textual image using an adaptive edge rounding filter, and annotating the one or more regions of bold text within the image document.

12 Claims, 6 Drawing Sheets

(56) References Cited

U.S. PATENT DOCUMENTS

2008/0282153 A1* 11/2008 Kindeberg ............ G06F 17/274
    715/256
2012/0134589 A1* 5/2012 Reddy .................. G06K 9/6255
    382/182
2018/0018774 A1* 1/2018 Kacher ..................... G06T 5/20

OTHER PUBLICATIONS

Yadav et al., "Detection of Bold and Italic Character in Devanagari Script", Journal, Feb. 2012, pp. 19-22, vol. 39, No. 2.
Javed et al., "Automatic Detection of Font Size Straight From Run Length Compressed Text Documents", Journal, 2014, pp. 818-825, vol. 5 (1).
Chaudhuri et al., "Automatic Detection of Italic, Bold and All-Capital Words in Document Images", Aug. 20, 1998, 5 pages, IEEE.
Saikrishna et al., "Script Independent Detection of Bold Words in Multi Font-Size Documents", Dec. 21, 2013, 5 pages, IEEE.

* cited by examiner

SYSTEM AND METHOD FOR DETECTING AND ANNOTATING BOLD TEXT IN AN IMAGE DOCUMENT

FIELD

This disclosure relates generally to image processing, and more particularly to system and method for detecting and annotating bold text in an image document.

BACKGROUND

In an increasing digital world, a huge amount of electronic documents are generated on a day-to-day basis by word processing applications (e.g., MS Word), by imaging (e.g., scanning) hard copy of the documents, or by other such means. Many a times these electronic documents are originally generated or otherwise converted into a more universally accessible image format such as a portable document format (.pdf), a JPEG format (.jpg or .jpeg), etc.

Typically, these electronic documents include important terms or sections in different text style (e.g., font, height, width, intensity, etc.) so as to facilitate ease of review and use. For example, business documents such as statement of work (SOW), master service agreement (MSA), etc. many include important terms or sections such as company name, contract date, contract termination date, important clauses in bold text. Further, in some documents such as white papers or research papers, titles, section headers, table headers, figure names may be in bold text.

Often, there may be a need to identify and/or extract these important terms or sections from such documents. For example, for morphological analysis (semantic analysis) of documents, bold text plays very important role in section segmentation and important information extraction. Further, if a table of contents is not provided for a document, then the user has to manually traverse through the entire document to identify required information, which is tedious process. Again, bold text plays an important role in facilitating such reviews by helping generate the table of content.

Current techniques to extract entities from an image format of a document based on text style are inefficient and cumbersome as the text style varies across the document(s) at multiples levels. For example, the text style in a document may vary in terms of intensity, resolution, skew, rotation, and so forth. Additionally, the current multilevel entity extraction techniques are highly time consuming. Further, the machine learning based techniques require a lot of training data, and training time. The machine learning based techniques are also not suited for resource constrained computing devices such as mobile devices.

SUMMARY

In one embodiment, a method for annotating bold text in an image document is disclosed. In one example, the method comprises receiving the image document. The method further comprises processing the image document to derive a digitized textual image. The method further comprises detecting one or more regions of bold text within the digitized textual image using an adaptive edge rounding filter. The method further comprises annotating the one or more regions of bold text within the image document.

In one embodiment, a system for annotating bold text in an image document is disclosed. In one example, the system comprises at least one processor and a memory communicatively coupled to the at least one processor. The memory stores processor-executable instructions, which, on execution, cause the processor to receive the image document. The processor-executable instructions, on execution, further cause the processor to process the image document to derive a digitized textual image. The processor-executable instructions, on execution, further cause the processor to detect one or more regions of bold text within the digitized textual image using an adaptive edge rounding filter. The processor-executable instructions, on execution, further cause the processor to annotate the one or more regions of bold text within the image document.

In one embodiment, a non-transitory computer-readable medium storing computer-executable instructions for annotating bold text in an image document is disclosed. In one example, the stored instructions, when executed by a processor, cause the processor to perform operations comprising receiving the image document. The operations further comprise processing the image document to derive a digitized textual image. The operations further comprise detecting one or more regions of bold text within the digitized textual image using an adaptive edge rounding filter. The operations further comprise annotating the one or more regions of bold text within the image document.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
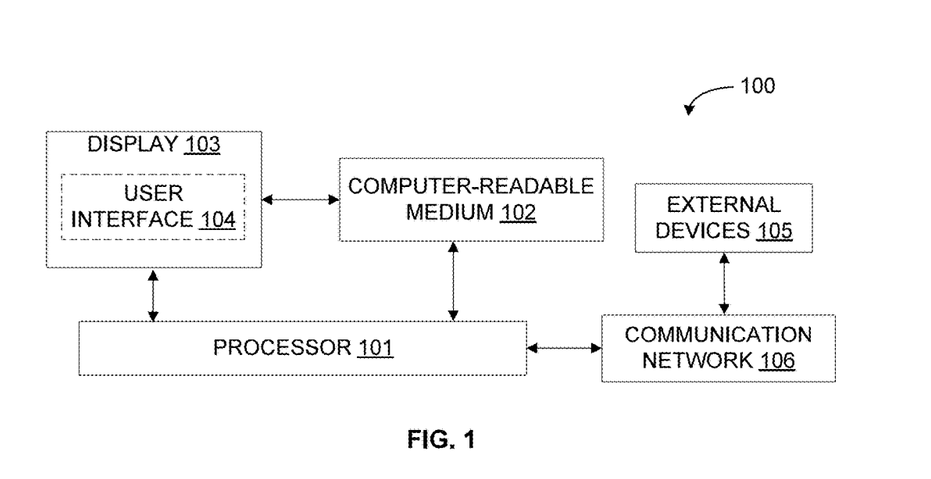
FIG. 1 is a block diagram of an exemplary system for detecting and annotating bold text in an image document in accordance with some embodiments of the present disclosure.

Referring now to FIG. 1, an exemplary system or bold text detection and annotation computing device 100 for detecting and annotating bold text in an image document is illustrated in accordance with some embodiments of the present disclosure. In particular, the system 100 implements a bold text detection and annotation engine to detect and annotate bold text in the image document. As will be described in greater detail in conjunction with FIG. 2, the bold text detection and annotation engine receives the image document, processes the image document to derive a digitized textual image, detects one or more regions of bold text within the digitized textual image using an adaptive edge rounding filter, and annotates the one or more regions of bold text within the image document.

The system 100 comprises one or more processors 101, a computer-readable medium (e.g., a memory) 102, and a display 103. The computer-readable storage medium 102 stores instructions that, when executed by the one or more processors 101, cause the one or more processors 101 to detect and annotate bold text in the image document in accordance with aspects of the present disclosure. The computer-readable storage medium 102 may also store various data (e.g., image document, digitized textual image, regions of interest, size of each region of interest, threshold size, regions of bold text, annotated image document, adaptive edge rounding filter, multi-dimensional K-nearest neighbor (KNN) algorithm, characters, dots per inch (dpi) and height of each character, radius for each character, etc.) that may be captured, processed, and/or required by the system 100. The system 100 interacts with a user via a user interface 104 accessible via the display 103. The system 100 may also interact with one or more external devices 105 over a communication network 106 for sending or receiving various data. The external devices 105 may include, but are not limited to, a remote server, a digital device, or another computing system.

Figure 2:
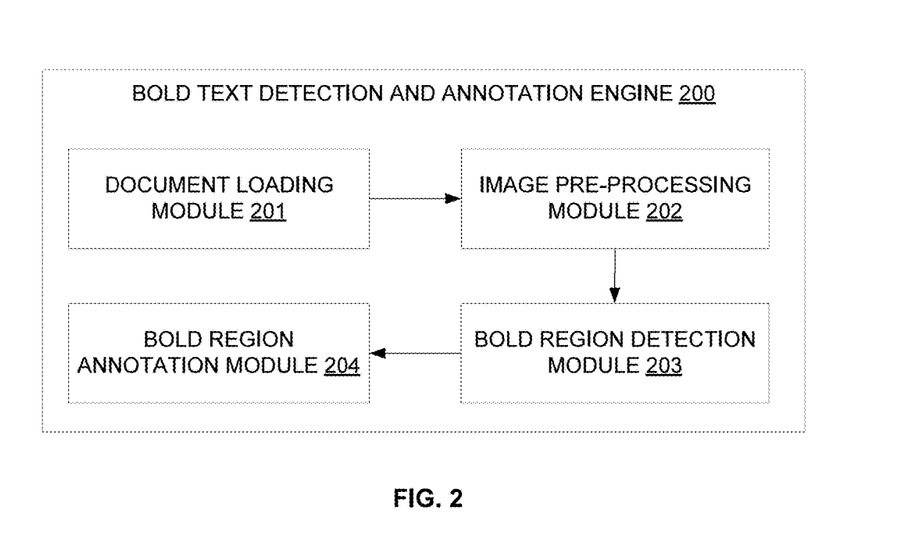
FIG. 2 is a functional block diagram of a bold text detection and annotation engine in accordance with some embodiments of the present disclosure.

Referring now to FIG. 2, a functional block diagram of the bold text detection and annotation engine 200 implemented by the system 100 of FIG. 1 is illustrated in accordance with some embodiments of the present disclosure. The bold text detection and annotation engine 200 may include various modules that perform various functions so as to detect and annotate bold text in the image document. In some embodiments, the bold text detection and annotation engine 200 comprises a document loading module 201, an image pre-processing module 202, a bold region detection module 203, and a bold region annotation module 204.

The document loading module 201 may receive image documents that need to be processed by the engine 200 from one or more sources. For example, in some embodiments, the document loading module 201 may receive an image document directly from an input device (e.g., scanner, camera) or an external device (e.g., smartphone, etc.). Additionally, in some embodiments, the document loading module 201 may receive the image document uploaded by a user via the user interface. The image document may be in any image format such as, but not limited to, a portable document format (.pdf), a joint photographic experts group format (.jpg or .jpeg), a tagged image file format (.tiff or .tif), a bitmap image file format (.bmp), a graphics interchange format (.gif), and a PNG format (.png).

The image pre-processing module 202 may derive a standard digitized image document from the received image document for subsequent processing. For example, in some embodiments, the image pre-processing module 202 may perform binarization of image document so as to convert a gray scale image document into a binary image document comprising only of black and white (i.e., 1's and 0's). It should be noted, in some embodiments, the image pre-processing module 202 may first convert a color image document into the greyscale image document, which may then be converted into the binary image document through binarization. As will be appreciated, in some embodiments, the black may be represented by 1's and the white may be represented by 0's. Alternatively, in some embodiments, the black may be represented by 0's and the white may be represented by 1's. For the purpose of this disclosure, the black pixels may be represented by 1's while the white pixels may be represented by 0's.

Additionally, the image pre-processing module 202 may remove any noise (e.g., salt and pepper noise) from the digitized image document. For example, the salt and pepper noise removal may include removal of any single black pixel (i.e., 1) among white pixels (i.e., 0's) or removal of any white pixel (i.e., 0) among black pixels (i.e., 1's). Further, the image pre-processing module 202 may identify and remove any graphical content (e.g., pictures, figures, engineering drawings, circuit diagrams, signature, seal, structural components, etc.) from the digitized image documents so as to derive digitized textual image. In some embodiments, the image pre-processing module 202 may identify graphical components based on density, area, and aspect ratio (i.e., width over height) of connected components (i.e., continuous sequence of 1's). Upon identification of the graphical content, the image pre-processing module 202 may remove the graphical content so as to derive digitized textual image comprising of only machine printed text. Moreover, the image pre-processing module 202 may identify boundaries of individual characters by determining connected components and applying segmentation among connected components.

The bold region detection module 203, detects regions of bold text and consequently regions of non-bold text within the digitized textual image using an adaptive edge rounding filter. In some embodiments, the bold region detection module 203 first determines a number of regions of interest by applying the adaptive edge rounding filter to the digitized textual image, and then determines one or more regions of bold text from among the multiple regions of interest using a multi-dimensional K-nearest neighbor (KNN) algorithm. Further, in some embodiments, a single iteration of the adaptive edge rounding filter may be applied to the digitized textual image.

The regions of interest corresponds to edge rounded structure (also referred to as blobs) created by the adaptive edge rounding filter. The adaptive edge rounding filter is adaptive to a size and an intensity of a character. As will be appreciated, bold text corresponds to a higher intensity (i.e., dots per inch (dpi)) of letter or word in comparison to its surrounding. The higher dpi may then be employed for detection of bold text detection in the image document.

For example, in some embodiments, for each of the characters identified by the image pre-processing module 202, the bold region detection module 203 determines a height of a character. The bold region detection module 203 then computes a radius for the character based on the dpi of the image document and the height of the character in accordance with equation (1) provided below. Thus, for a 300 dpi image and a character height of 27 pixels, the radius is computed to be approximately 11 (i.e., 300/27). The radius defines how many pixels adjacent to an individual pixel in the character is to be considered in each direction.

$$\text{radius} = \text{dpi/height of character in pixels} \quad \text{Equation (1)}$$

Further, for each of the pixels in the character, the bold region detection module 203 determines a number of pixels within the radius of a pixel. These pixels may be referred to as subpixels for the sake of understanding and clarity. The bold region detection module 203 then determines a dominant pixel type (i.e., black or white) among the subpixels. The dominant pixel type may be determined by determining greater of the number of black subpixels (i.e., 1's) and the number of white subpixels (i.e., 0's). Thus, if the count of black pixels is more than white pixels then the dominant pixel type is black and vice versa. The bold region detection module 203 then sets the pixel to the dominant pixel type by replacing the pixel with the dominant pixel type if needed. For example, if the pixel in consideration is white while the dominant pixel type is black, then the pixel is consideration is set to black.

The bold region detection module 203 repeats the process for each of the pixels in the character and for each of the characters in the digitized textual image. It should be noted that, in some embodiments, only a single iteration of process is performed on the digitized textual image so as to create an output image (also referred to as filter image) comprising of edge rounded structure or blobs.

After the edge rounding, the bold region detection module 203 applies the multi-dimensional KNN algorithm on the filter image comprising of blobs so as to determine regions of bold text. Thus, the bold region detection module 203 may identify boundaries of individual blobs by determining connected components (i.e., continuous sequence of 1's) and applying segmentation among connected components. Upon segmentation, the bold region detection module 203 determines a size (height, width and area) of each of the blobs, and then selects those above a threshold size. The selected blobs correspond to regions of bold text from among multiple regions of interest. It should be noted that the bold region detection module 203 determines the threshold size for the blobs by using the multi-dimensional KNN algorithm. Further, in some embodiments, the application of the multi-dimensional KNN algorithm on the filter image generates an output image (also referred to as KNN image) comprising of regions of bold text.

The bold region annotation module 204 annotates the regions of bold text in the original image document. Alternatively, the bold region annotation module 204 annotates the bold text in the original image document based on the regions of bold text. In some embodiments, the bold region annotation module 204 annotates the regions of bold text in the original image document by dilating regions, in the original image document, corresponding to the determined regions of bold text to a corresponding word boundary. It should be noted that, in some embodiments, regions in the original image document that correspond to the regions of bold text may be determined by superimposing the KNN image comprising of regions of bold text over the original image document. In other words, the bold region annotation module 204 use blobs created by the bold region detection module 203 to seed fill the dilated image to get regions of bold text in a given image document.

It should be noted that the bold text detection and annotation engine 200 may be implemented in programmable hardware devices such as programmable gate arrays, programmable array logic, programmable logic devices, and so forth. Alternatively, the bold text detection and annotation engine 200 may be implemented in software for execution by various types of processors. An identified engine of executable code may, for instance, comprise one or more physical or logical blocks of computer instructions which may, for instance, be organized as an object, procedure, function, module, or other construct. Nevertheless, the executables of an identified engine need not be physically located together, but may comprise disparate instructions stored in different locations which, when joined logically together, comprise the engine and achieve the stated purpose of the engine. Indeed, an engine of executable code could be a single instruction, or many instructions, and may even be distributed over several different code segments, among different applications, and across several memory devices.

Figure 3:
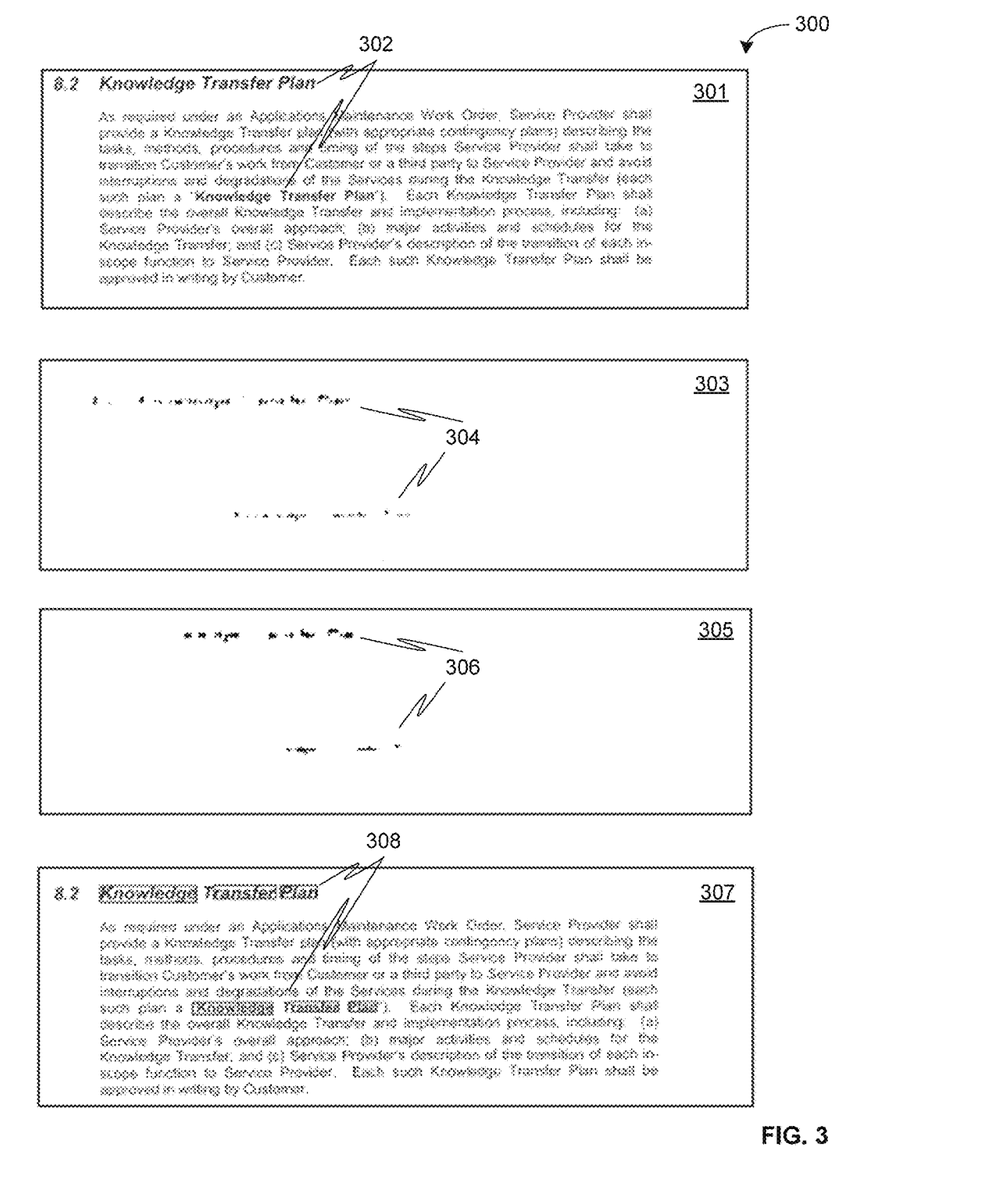
FIG. 3 illustrates exemplary image documents at various stages of processing by the bold text detection and annotation engine in accordance with some embodiments of the present disclosure.

Referring now to FIG. 3, exemplary image documents 300 at various stages of processing by the bold text detection and annotation engine 200 is illustrated in accordance with some embodiments of the present disclosure. The document loading module 201 receives an input image document 301 comprising of bold text 302. The input image document 301 is then digitized and pre-processed by the image pre-processing module 202 to derive a digitized textual image for subsequent processing. The bold region detection module 203 applies the adaptive edge rounding filter to the digitized textual image to generate an output image (filter image) 303 comprising of blobs 304. The bold region detection module 203 further applies the multi-dimensional KNN algorithm on the filter image 303 to generate an output image (KNN image) 305 comprising of regions of bold text 306. The bold region annotation module 204 then annotates regions of bold text 306 in the input image document 301, and generates a final image 307 with annotated regions of bold text 308.

As will be appreciated by one skilled in the art, a variety of processes may be employed for detection and annotation of bold regions in the image document. For example, the exemplary system 100 and the associated bold text detection and annotation engine 200 may detect and annotate bold regions in the image document by the processes discussed herein. In particular, as will be appreciated by those of ordinary skill in the art, control logic and/or automated routines for performing the techniques and steps described herein may be implemented by the system 100 and the associated bold text detection and annotation engine 200, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 4:
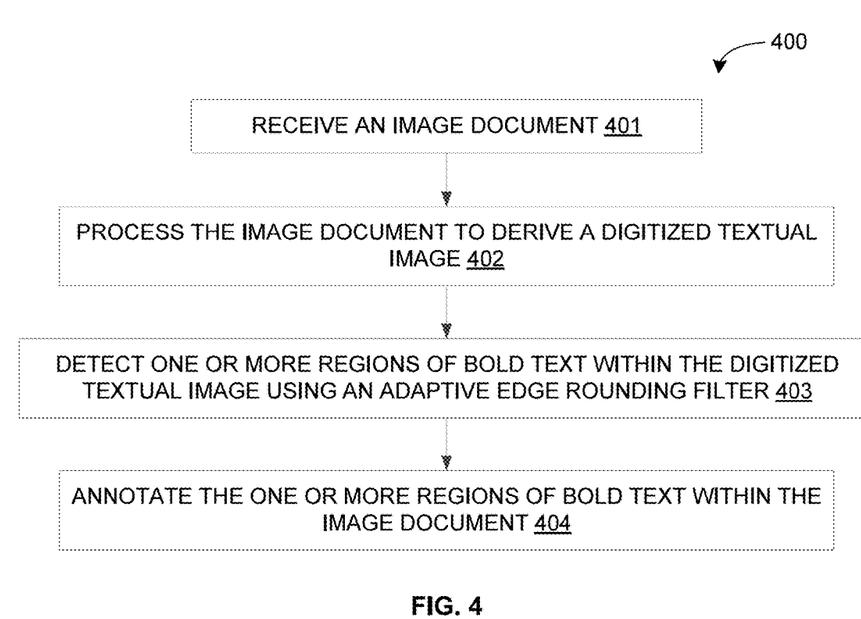
FIG. 4 is a flow diagram of an exemplary process for detecting and annotating bold text in an image document in accordance with some embodiments of the present disclosure.

For example, referring now to FIG. 4, exemplary control logic 400 for detecting and annotating bold text in an image document via a system, such as system 100, is depicted via a flowchart in accordance with some embodiments of the present disclosure. As illustrated in the flowchart, the control logic 400 includes the steps of receiving the image document at step 401, processing the image document to derive a digitized textual image at step 402, detecting one or more regions of bold text within the digitized textual image using an adaptive edge rounding filter at step 403, and annotating the one or more regions of bold text within the image document at step 404.

In some embodiments, processing the image document at step 402 comprises generating a digitized image of the image document, and removing at least one of a noise and a graphical region from the digitized image to derive the digitized textual image. Additionally, in some embodiments, the digitized image comprises a binary image.

In some embodiments, detecting the one or more regions of bold text at step 403 comprises determining a plurality of regions of interest by applying the adaptive edge rounding filter to the digitized textual image. Additionally, in some embodiments, applying the adaptive edge rounding filter comprises determining a plurality of characters in the digitized textual image, and, for each of the plurality of characters, determining a height of a character and determining a radius for the character based on a dots per inch (dpi) of the image document and the height of the character. Applying the adaptive edge rounding filter further comprises, for each of a plurality of pixels in the character, determining a plurality of subpixels within the radius of a pixel, determining a dominant pixel type among the plurality of subpixels, and setting the pixel to the dominant pixel type.

In some embodiments, detecting the one or more regions of bold text at step 403 further comprises applying a multi-dimensional KNN algorithm on the plurality of regions of interest. Additionally, in some embodiments, applying the multi-dimensional KNN algorithm comprises determining a threshold size for the plurality of regions of interest using the multi-dimensional KNN algorithm, determining a size of each of the plurality of regions of interest, and selecting the one or more regions of bold text from the plurality of regions of interest based on the size and the threshold size. Further, in some embodiments, annotating the one or more regions of bold text at step 404 comprises dilating one or more regions, in the image document, corresponding to the one or more regions of bold text to a corresponding word boundary.

Figure 5A:
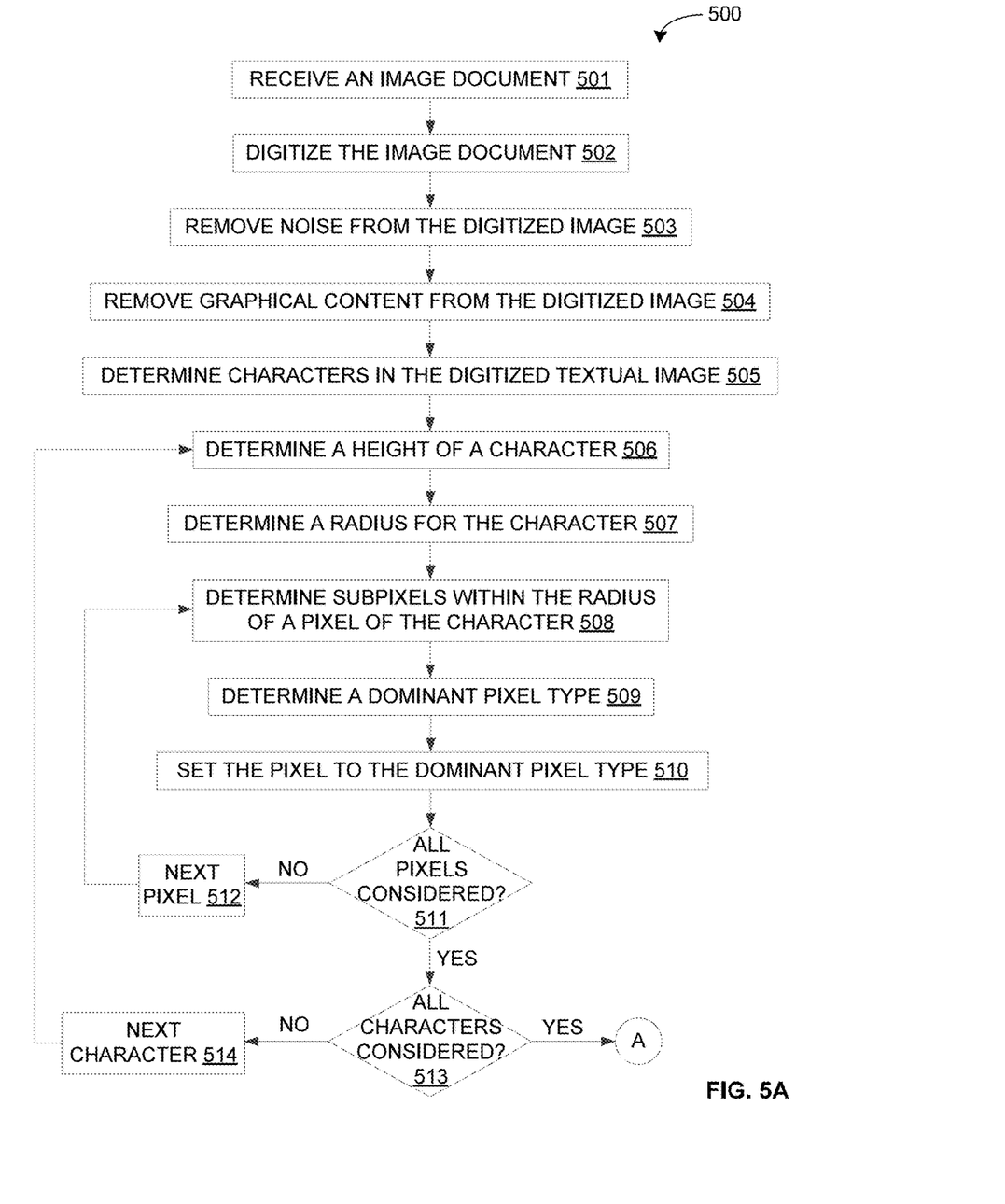
FIGS. 5A and 5B is a flow diagram of a detailed exemplary process for detecting and annotating bold text in an image document in accordance with some embodiments of the present disclosure.
Figure 5B:
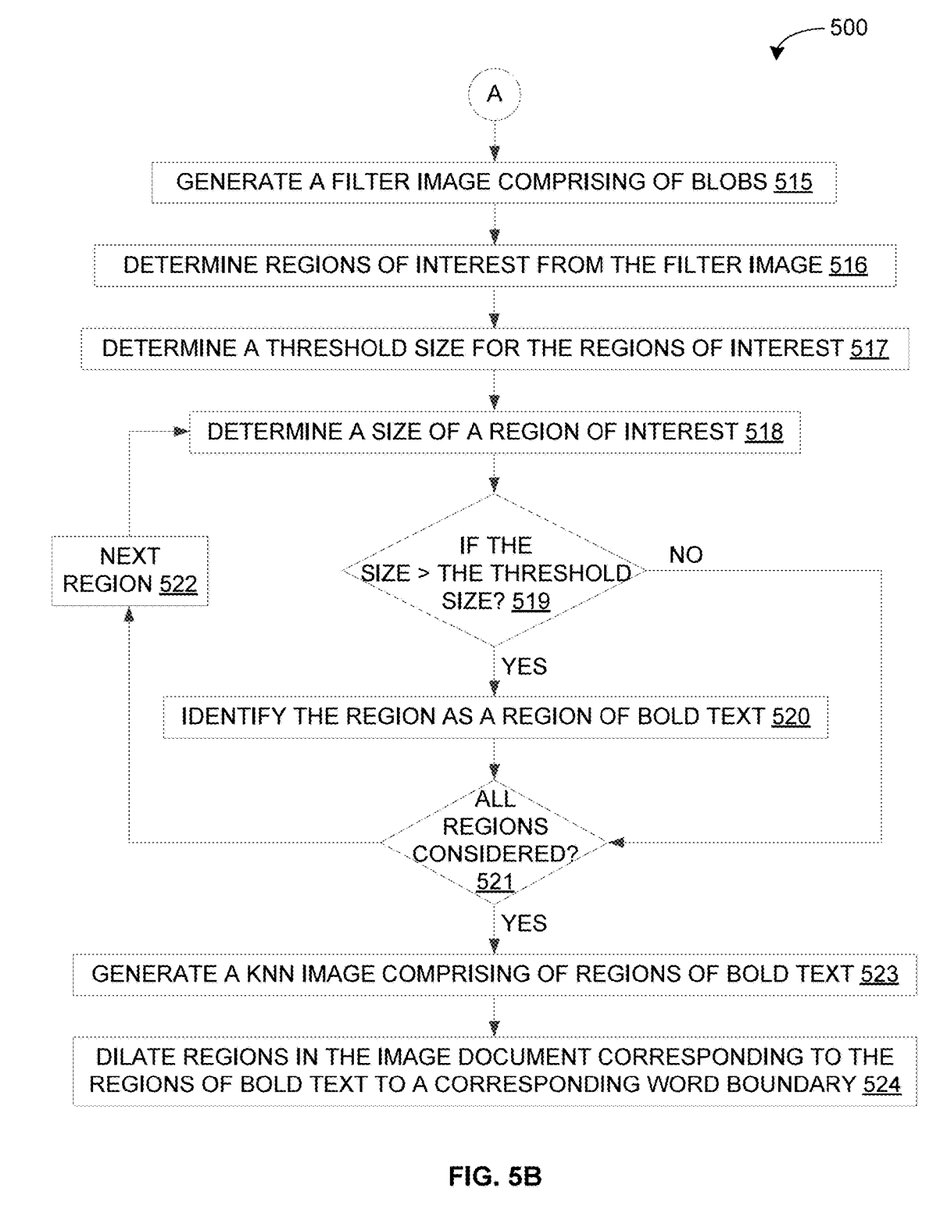

Referring now to FIGS. 5A and 5B, exemplary control logic 500 for detecting and annotating bold text in an image document is depicted in greater detail via a flowchart in accordance with some embodiments of the present disclosure. As illustrated in the flowchart, the control logic 500 includes the step of receiving an image document via the document loading module 201 at step 501. The control logic 500 further includes the step of pre-processing the image document to derive a digitized textual image via the image pre-processing module 202. The pre-processing involves digitizing the image document to generate a digitized image (e.g., binary image) at step 502, removing noise (e.g., salt and pepper noise) from the digitized image at step 503, removing graphical content from the digitized image to generate a digitized textual image at step 504, and determining characters in the digitized textual image at step 505. As discussed above, the characters may be determined at step 505 by determining connected components and applying segmentation between connected components.

The control logic 500 further includes the step of applying a single iteration of the adaptive edge rounding filter to determine regions of interest in the digitized textual image via the bold region detection module 203. The application of the adaptive edge rounding filter involves determining a height of a character at step 506, determining a radius for the character based on a dpi of the image document and the height of the character at step 507, determining subpixels within the radius of a pixel of the character at step 508, determining a dominant pixel type at step 509, and setting the pixel to the dominant pixel type at step 510. The process is repeated for all pixels and for all the characters so as to generate an image with edge rounded structures or blobs indicating regions of interest. Thus, the control logic 500 includes the step of determining if all the pixels in the character have been considered at step 511. If all the pixels in the character have not been considered at step 511, then the control logic 500 includes the step of selecting next pixel at step 512. The control logic 500 then flows back to step 508. However, if all the pixels in the character have been considered at step 511, then the control logic 500 includes the step of determining if all the characters in the image document have been considered at step 513. If all the characters in the image document have not been considered at step 513, then the control logic 500 includes the step of selecting next character at step 514. The control logic 500 then flows back to step 506. However, if all the characters in the image document have been considered at step 513, then the control logic 500 includes the step of generating a filter image comprising of regions of interest corresponding to edge rounded structures or blobs at step 515.

The control logic 500 further includes the step of applying the multi-dimensional KNN algorithm to determine regions of bold text from among the regions of interest via the bold region detection module 203. The application of the multi-dimensional KNN algorithm involves determining regions of interest from the filter image at step 516. Again, as discussed above, the regions of interest may be determined by determining connected components and applying segmentation between connected components. The application of the multi-dimensional KNN algorithm further involves determining a threshold size for the regions of interest using the multi-dimensional KNN algorithm at step 517, determining a size of a region of interest at step 518, and determining if the size is greater than the threshold size at step 519. If the size is greater than the threshold size at step 519, then the region is identified as a region of bold text at step 520. However, if the size is not greater than the threshold size at step 519, then the region is ignored from consideration. The process is repeated for all the regions of interest so as to generate an image with identified regions of bold text. Thus, the control logic 500 includes the step of determining if all the regions of interest have been considered at step 521. If all the regions of interest have not been considered at step 521, then the control logic 500 includes the step of selecting next region of interest at step 522. The control logic 500 then flows back to step 518. However, if all the regions of interest have been considered at step 521, then the control logic 500 includes the step of generating a KNN image comprising of regions of bold text at step 523, and dilating regions in the image document corresponding to the identified regions of bold text to a corresponding word boundary at step 524.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
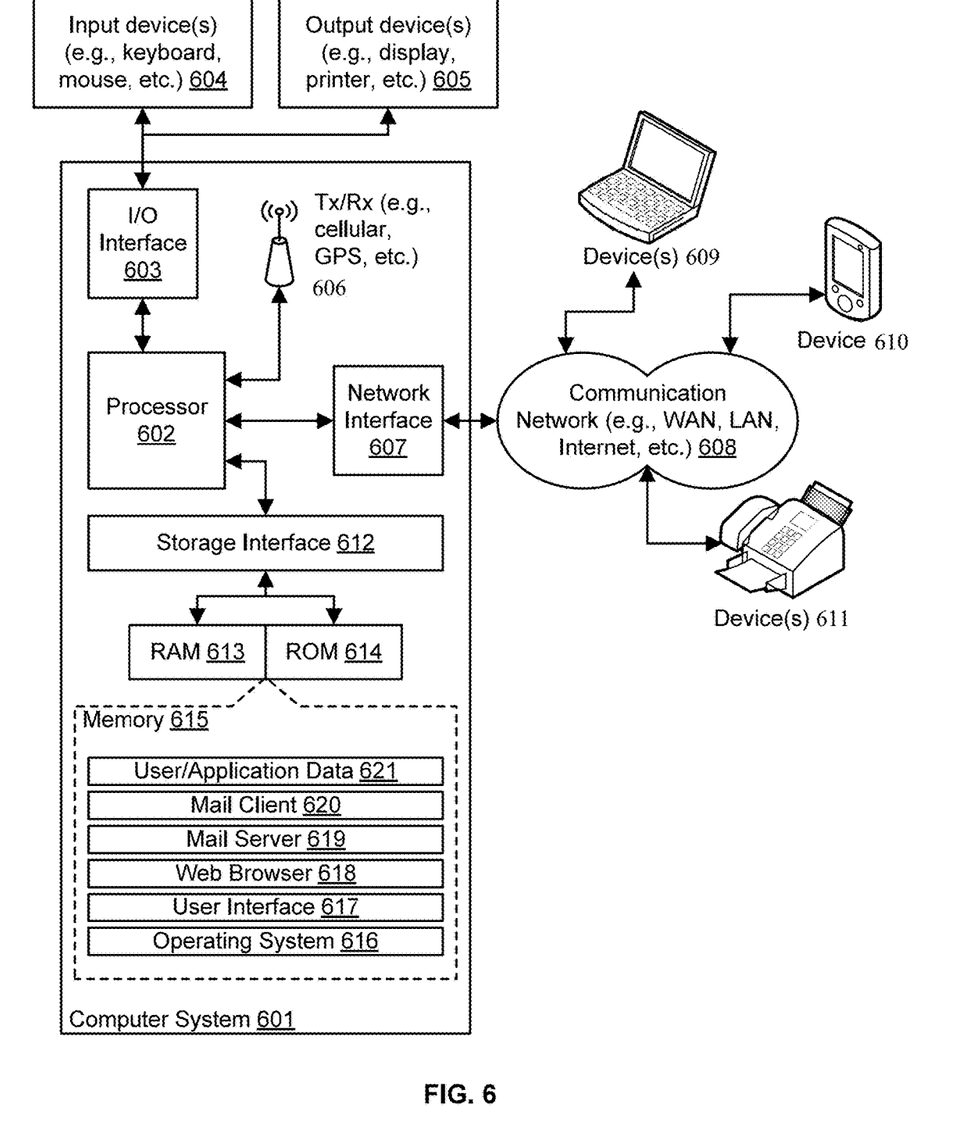
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 601 for implementing embodiments consistent with the present disclosure is illustrated. Variations of computer system 601 may be used for implementing system 100 and bold text detection and annotation engine 200 for detecting and annotating bold text in an image document. Computer system 601 may comprise a central processing unit ("CPU" or "processor") 602. Processor 602 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may communicate, via a storage interface 612, with one or more memory devices (e.g., RAM 613, ROM 614, etc.) hosting memory 615. The storage interface 612 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 601 may implement a web browser 618 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 601 may implement a mail server 619 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as Apple Mail, Microsoft Entourage, Microsoft Outlook, Mozilla Thunderbird, etc.

In some embodiments, computer system 601 may store user/application data 621, such as the data, variables, records, etc. (e.g., image document, digitized textual image, regions of interest, size of each region of interest, threshold size, regions of bold text, annotated image document, adaptive edge rounding filter, multi-dimensional KNN algorithm, characters, dots per inch (dpi) and height of each character, radius for each character, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for a mechanism to detect and annotate bold text in an image document. In particular, the techniques provide for a mechanism for automatic and adaptive bold text detection and annotation in image document using the adaptive edge rounding filter with single iteration and the multi-dimensional KNN algorithm. The edge rounding filter is adaptive to character font height and dpi of the image, and creates in a single iteration blobs for all bold characters through a simple neighboring pixels comparisons for each of the pixels. The multi-dimensional KNN algorithm distinguishes bold text blobs from non-bold text blobs by comparing size (i.e., height, width and area) of each of the blobs with a threshold size determined using the algorithm.

Additionally, as will be appreciated by those skilled in the art, the techniques described in the various embodiments discussed above does not require to run optical character recognition (OCR) of the image document. The techniques involve less computation since it is single iteration of edge rounding filter. The technique is also independent of font height of character, or color of the character in the image document.

Further, as will be appreciated by those skilled in the art, the techniques described in the various embodiments discussed above may be useful in detecting and annotating important terms or sections in a bold text so as to facilitate the ease of review and use of electronic documents. Moreover, the techniques described in the various embodiments discussed above may be easily extended to separation of information of different style and annotating the text of different style in the image document.

The specification has described system and method for detecting and annotating bold text in an image document. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for annotating bold text in image documents, the method implemented by a bold text detection and annotation computing device and comprising:
   processing an image document to derive a digitized textual image;
   applying an adaptive edge rounding filter to the digitized textual image to generate a filter image comprising one or more edge rounded structures corresponding to one or more regions of interest within the digitized textual image, wherein applying the adaptive edge rounding filter comprises:
      determining a plurality of characters in the digitized textual image;
      determining, for each of the plurality of characters, a height of a character, a radius for the character based on a dots per inch (dpi) of the image document and the height of the character;
      determining, for each of a plurality of pixels in the character, a plurality of subpixels within the radius of a pixel and a dominant pixel type among the plurality of subpixels; and
      setting the pixel to the dominant pixel type;
   determining one or more regions of bold text from the one or more regions of interest in the filter image; and
   annotating the one or more regions of bold text within the image document.

2. The method of claim 1, wherein processing the image document comprises:
- generating a digitized image of the image document, wherein the digitized image comprises a binary image; and
- removing at least one of noise and a graphical region from the digitized image to derive the digitized textual image.

3. The method of claim 1, wherein determining the one or more regions of bold text comprises:
- determining a threshold size for a plurality of regions of interest using a multi-dimensional K-nearest neighbor (KNN) algorithm;
- determining a size of each of the plurality of regions of interest; and
- selecting the one or more regions of bold text from the plurality of regions of interest based on the size and the threshold size.

4. The method of claim 1, wherein annotating the one or more regions of bold text comprises dilating one or more regions, in the image document, corresponding to the one or more regions of bold text to a corresponding word boundary.

5. A bold text detection and annotation computing device, comprising at least one processor and a memory comprising instructions stored thereon, wherein the at least one processor executes the instructions to:
- process an image document to derive a digitized textual image;
- apply an adaptive edge rounding filter to the digitized textual image to generate a filter image comprising one or more edge rounded structures corresponding to one or more regions of interest within the digitized textual image, wherein applying the adaptive edge rounding filter comprises:
  - determining a plurality of characters in the digitized textual image;
  - determining, for each of the plurality of characters, a height of a character, a radius for the character based on a dots per inch (dpi) of the image document and the height of the character;
  - determining, for each of a plurality of pixels in the character, a plurality of subpixels within the radius of a pixel and a dominant pixel type among the plurality of subpixels; and
  - setting the pixel to the dominant pixel type;
- determine one or more regions of bold text from the one or more regions of interest in the filter image; and
- annotate the one or more regions of bold text within the image document.

6. The bold text detection and annotation computing device of claim 5, wherein the at least one processor further executes the instructions to:
- generate a digitized image of the image document, wherein the digitized image comprises a binary image; and
- remove at least one of noise and a graphical region from the digitized image to derive the digitized textual image.

7. The bold text detection and annotation computing device of claim 5, wherein the at least one processor further executes the instructions to:
- determine a threshold size for a plurality of regions of interest using a multi-dimensional K-nearest neighbor (KNN) algorithm;
- determine a size of each of the plurality of regions of interest; and
- select the one or more regions of bold text from the plurality of regions of interest based on the size and the threshold size.

8. The bold text detection and annotation computing device of claim 5, wherein the at least one processor further executes the instructions to dilate one or more regions, in the image document, corresponding to the one or more regions of bold text to a corresponding word boundary.

9. A non-transitory computer-readable medium having stored thereon a set of computer-executable instructions for annotating bold text in image documents that, when executed by one or more processors, cause the one or more processors to:
- process an image document to derive a digitized textual image;
- apply an adaptive edge rounding filter to the digitized textual image to generate a filter image comprising one or more edge rounded structures corresponding to one or more regions of interest within the digitized textual image, wherein applying the adaptive edge rounding filter comprises:
  - determining a plurality of characters in the digitized textual image;
  - determining, for each of the plurality of characters, a height of a character, a radius for the character based on a dots per inch (dpi) of the image document and the height of the character;
  - determining, for each of a plurality of pixels in the character, a plurality of subpixels within the radius of a pixel and a dominant pixel type among the plurality of subpixels; and
  - setting the pixel to the dominant pixel type;
- determine one or more regions of bold text from the one or more regions of interest in the filter image; and
- annotate the one or more regions of bold text within the image document.

10. The non-transitory computer-readable medium of claim 9, wherein the instructions, when executed by the one or more processors further cause the one or more processors to:
- generate a digitized image of the image document, wherein the digitized image comprises a binary image; and
- remove at least one of noise and a graphical region from the digitized image to derive the digitized textual image.

11. The non-transitory computer-readable medium of claim 9, wherein the instructions, when executed by the one or more processors, further cause the one or more processors to:
- determine a threshold size for a plurality of regions of interest using a multi-dimensional K-nearest neighbor (KNN) algorithm;
- determine a size of each of the plurality of regions of interest; and
- select the one or more regions of bold text from the plurality of regions of interest based on the size and the threshold size.

12. The non-transitory computer-readable medium of claim 9, wherein the instructions, when executed by the one or more processors, further cause the one or more processors to dilate one or more regions, in the image document, corresponding to the one or more regions of bold text to a corresponding word boundary.

* * * * *